United States Patent [19]

Daver

[11] 3,971,657

[45] July 27, 1976

[54] SINTERING OF PARTICULATE METAL

[75] Inventor: Edul M. Daver, Westfield, N.J.

[73] Assignee: Alcan Aluminum Corporation, Cleveland, Ohio

[22] Filed: Feb. 13, 1974

[21] Appl. No.: 442,062

[52] U.S. Cl. ............................... 75/211; 75/222
[51] Int. Cl.² ........................................ B22F 3/10
[58] Field of Search ............................ 75/222, 211

[56] References Cited
UNITED STATES PATENTS

| | | | |
|---|---|---|---|
| 2,744,011 | 5/1956 | Samuel et al. | 75/222 |
| 2,876,097 | 3/1959 | Fisher | 75/222 |
| 3,004,332 | 10/1961 | Werner | 75/222 |
| 3,195,226 | 7/1965 | Valyi | 75/222 |
| 3,362,818 | 1/1968 | Schwarzkopf et al. | 75/222 |

OTHER PUBLICATIONS
Metals Handbook, vol. 6 pp. 676–677, 8th Ed., 1971.

*Primary Examiner*—Benjamin R. Padgett
*Assistant Examiner*—B. H. Hunt
*Attorney, Agent, or Firm*—Cooper, Dunham, Clark, Griffin & Moran

[57] ABSTRACT

In production of sintered bodies of particulate metal, especially porous sintered bodies, from particles of metal having a refractory oxide coating, a minor proportion of a flux is mixed with the particulate metal before sintering to aid in removing oxide from surfaces of the metal particles. The particulate metal may be aluminum, with which there may be mixed a minor proportion of particles of an alloying element. The flux may be a mixture of potassium fluoaluminate complexes; the residue of this flux, after sintering, provides a coating that aids in protecting the sintered article against corrosion.

12 Claims, No Drawings

SINTERING OF PARTICULATE METAL

BACKGROUND OF THE INVENTION

This invention relates to powder metallurgy. More particularly, it relates to articles made by sintering particulate metal and to methods and compositions for producing such articles. In one important specific aspect, it is directed to improvements in loose or gravity sintering of particulate aluminum, for production of porous aluminum filters and the like. The term "aluminum," as herein used, embraces aluminum metal and alloys thereof.

In conventional powder metallurgical operations, a mass or body of particulate metal is compacted into a desired shape under substantial pressure and is then sintered to effect metal-to-metal bonding of the particles, thereby providing an article having useful structural strength. Sometimes, however, the compacting step is performed with minimal pressure or even entirely omitted, in order to produce an article of low density and high porosity such as a filter. Thus, in so-called loose or gravity sintering, mold or cavity is filled with uncompacted metal powder which is heated to sintering temperature in the cavity.

Articles have been produced by powder metallurgy from a variety of metals. Some of these metals, such as aluminum, present problems in that particles of the metal tend to bear an oxide coating that inhibits desired bonding in the sintering step. Other materials which, in particulate state, also tend to have refractory oxide surface layers (i.e., oxide coatings not readily reducible by conventional means) include titanium, chromium, silicon, manganese, beryllium, zirconium, and zinc. Stated with reference to aluminum (which has special commercial importance for various powder metallurgical applications), when high-pressure compacting is employed prior to sintering, the oxide coatings may be ruptured sufficiently to provide localized metal-to-metal contact; diffusion at these contact sites, and further bread-up of the oxide skin by the liquid phase formed by alloying elements during sintering, may then enable attainment of satisfactory bonding. If compacting pressure is low or absent (as in the case of loose sintering, i.e., to produce a filter or other high-porosity article), however, the oxide coating of the particles is not broken. In addition, the particles in such instances are more uniform in size than they are when a high-density article is to be produced; consequently the contact points are reduced, with resultant decrease in diffusion. For these reasons, then, difficulties have heretofore been encountered in efforts to produce highly porous articles by powder metallurgy from metals such as aluminum.

SUMMARY OF THE INVENTION

The present invention broadly contemplates the provision of a minor proportion of a flux in mixture with particulate metal (e.g. a particulate metal characterized by refractory oxide coatings), prior to sintering of the metal. During sintering, the flux melts, spreading and coating the metal particles, and acts to remove oxide from the surfaces. In this way, satisfactory metal-to-metal bonding can be achieved in sintering of oxide-coated metal paticles such as aluminum, even under conditions such as loose sintering.

It has been found experimentally that suitable fluxes include certain materials heretofore known for use in fluxing aluminum for other purposes, e.g. various metal chorides and fluorides and mixtures thereof. Stated generally, the flux must have the properties of acting as a flux to remove metal oxide, becoming reactive (i.e., capable of removing the oxide, and therefore ordinarily being at least partially molten) at the sintering temperatures, and being essentially inert with respect to the particulate metal at such temperatures.

In an important specific sense, the invention further particularly contemplates the use, as a flux, of an intimate mixture of potassium fluoaluminate complexes, e.g. a mixture of $KALF_4$ and $K_3ALF_6$, essentially free of unreacted potassium fluoride. These mixtures, which are very sparingly soluble in water and non-hygroscopic, are found highly efficacious; moreover, they are free of any tendency to promote corrosion. Thus, a special advantage of these fluxes is that the flux residue need not be removed after sintering, as is required when other fluxes are used, in order to prevent corrosion. Indeed, the present flux residue constitutes a coating that aids in protecting the sintered article against corrosion. As will therefore be understood, use of the potassium fluoaluminate complexes in sintering particulate metal may be advantageous, i.e., for attainment of protection against corrosion, even when the metal and/or process conditions employed are not such as to require use of a flux for oxide removal.

In a further specific sense, the invention contemplates the provision of procedure for sintering particulate aluminum, including mixing with the particulate aluminum a minor proportion of a flux that becomes reactive, but is essentially inert with respect to metallic aluminum, at aluminum sintering temperatures. Advantageously, as a further particular feature of the invention, the flux may be a mixture of potassium fluoaluminates as mentioned above. A minor proportion of one or more alloying elements in particulate form may also be mixed with the particulate aluminum and flux prior to sintering; presence of such particulate alloying material helps activate sintering by the formation of a liquid phase and thus, together with the flux, contributes to attainment of satisfactory bonding in the sintering step. The use of a particulate alloying element or elements is especially preferred for loose sintering of particulate aluminum of high oxide content, e.g. air-atomized aluminum powder.

If the alloying element used differs appreciably from aluminum in density, it is preferably used in flake form, to aid in uniform distribution and prevention of segregation as well as to enhance alloying and sintering. To assist further in maintaining alloying elements uniformly dispersed during transport and handling of the mixture prior to sintering, a liquid desegregator (e.g. mineral spirits), which is compatible with the aluminum during sintering, may also be added.

For loose sintering in accordance with the invention, a mixture of particulate aluminum and flux (with or without alloying elements) as described above is placed (without being compacted) in a suitable mold or cavity formed of a material that does not react with aluminum at the sintering temperature, and is then sintered (i.e., in the mold) in a dry atmosphere of gas essentially non-oxidizing under the sintering conditions. In this way, sintered aluminum articles of low density, high porosity, and satisfactory structural strength may readily be produced. Examples of such articles include filters and elements for metering orifices, mufflers, vibration and shock absorbers, vacuum forming molds, heat exchangers and absorbers, and venting bodies.

The invention further embraces articles made by the foregoing method, including a porous sintered metal (e.g. aluminum) article such as a filter or the like incorporating a coating of flux residue consisting essentially of potassium fluoaluminate complexes for protecting the article from corrosion. Such a filter has advantageously low susceptibility to corrosion, because the flux residue coats and protects metal surfaces of the filter against corrosion. In addition, the invention embraces compositions for use in producing sintered articles, e.g. mixtures comprising particulate aluminum and a flux consisting essentially of potassium fluoaluminate complexes.

Further features and advantages of the invention will be apparent from the detailed description hereinbelow set forth.

DETAILED DESCRIPTION

For purposes of illustration, the invention will be described with reference to the production of a sintered aluminum filter, utilizing as a flux an intimate mixture of potassium fluoaluminate complexes.

The starting material may, in a broad sense, be any suitable form of particulate metallic aluminum, e.g. air-atomized aluminum powder of irregular particle shape having an oxygen content (in the oxide coating) of about 0.2% to about 0.3% by weight, or cut aluminum wire, etc. In general, for use in a filter, the particulate aluminum is relatively uniformly sized.

Referring to the flux, the term "potassium fluoaluminate complexes" as herein used refers to complexes of the type formed by fusion of $ALF_3$ and $KF$, such complexes having the formulas $K_3ALF_6$ and $KALF_4$. One method of preparing such a flux comprises mixing $ALF_3$ and $KF$ in appropriate proportions and fusing the mixture to constitute the same as an intimate mixture of the complexes. Thus, X-ray diffraction examination of the solidified residue of the fused eutectic mixture of $KF$ and $ALF_3$, which occurs at about 45.8% $KF$ and 54.2% $ALF_3$, indicates that virtually all the fluoride contents are in the form of $K_3ALF_6$ and $KALF_4$, which are very sparingly soluble in water and are non-hygroscopic. In fact, the fused eutectic consists of these two phases and not of $KF$ and $ALF_3$.

It is to be understood that all percentages herein are expressed as percentages by weight, unless otherwise stated.

The liquidus point of a mixture of potassium fluoaluminate complexes varies depending upon the composition of the mixture, expressed as relative proportions of $ALF_3$ and $KF$, reaching a minimum (about 560°C) at the aforementioned eutectic composition. For many purposes, it is especially preferred in the practice of the invention to employ a flux at or close to this eutectic composition; however, in a broader sense, the invention embraces the use as fluxes of intimate mixtures of potassium fluoaluminate complexes having a composition corresponding to an $ALF_3/KF$ ratio, in parts by weight, between about 65:35 and about 45:55 (preferably between about 60:40 and about 50:50) and, as stated, essentially free of unreacted potassium fluoride.

Flux compositions of this type are disclosed in the copending U.S. patent application of Ian Thomas Taylor et al., Ser. No. 384,272 filed July 31, 1973, for Brazing Aluminium, and assigned to Alcan Research and Development Limited. That application has subsequently been abandoned in favor of the continuation-in-part application of Eric Robert Wallace et al., Ser. No. 447,168 filed Mar. 1, 1974 for Joining of Metal Surfaces, which application in turn has been abandoned in favor of copending continuation application Ser. No. 620,112 filed Oct. 6, 1975, now allowed, both of the latter applications having also been assigned to Alcan Research and Development Limited.

At compositions corresponding to an $AlF_3$ content below about 60%, the mixture of potassium fluoaluminate complexes, in dry state, consists essentially of $K_3AlF_6$ and $KAlF_4$. At higher levels of $AlF_3$ content within the stated range, the mixtures are constituted of $KAlF_4$ with some unreacted $ALF_3$ (which is insoluble in water) but, again, essentially free of unreacted $KF$; such mixtures ($KALF_4$ with $ALF_3$) are embraced within the term "mixtures of potassium fluoaluminate complexes" as used herein. Between that part of the flux composition range in which the flux is a mixture of $KALF_4$ with $K_3AlF_6$, and that part of the range in which the flux is a mixture of $KALF_4$ with $ALF_3$, there is a unique point (i.e., a unique value of the $AlF_3/KF$ ratio, slightly below that corresponding to 60% $AlF_3$) at which the composition consists of $KAlF_4$ alone. Thus the stated composition range inherently includes this point at which the "mixture of complexes" is solely $KAlF_4$; in other words, pure $KAlF_4$ lies at a unique intermediate point within the stated range. Accordingly, the term "mixtures of potassium fluoaluminate complexes" as used herein further inherently embraces a composition consisting essentially of $KAlF_4$. Minor amounts of other fluorides (e.g. $LiF$, $NaF$, or $CaF_2$) may be incorporated in the flux.

An important feature of these fluxes is that they are essentially free of unreacted potassium fluoride. In this way, the avantageous properties of a fluoride flux (e.g. an $AlF_3$-$KF$ mixture) are realized without the problems (such as hygroscopicity) associated with unreacted potassium fluoride. These fluxes are available in the form of a fine dry powder which blends readily with particulate metal; they act to remove oxides from metal surfaces generally, and in particular they provide satisfactory loose sintering, e.g. of aluminum particles, producing sintered articles having a clean, bright appearance; and, as noted, the flux residue that remains after sintering is not only non-corrosive but indeed aids in protecting the sintered article against corrosion.

Methods of preparing such fluxes have been developed which include mixing and fusing $AlF_3$ and $KF$, as noted above; or mixing $KAlF_4$ and $KF$; or mixing previously prepared $K_3AlF_6$ and $KAlF_4$; or mixing previously prepared $K_3AlF_6$ and $AlF_3$. The stated intimate mixtures of potassium fluoaluminate complexes (essentially free of unreacted $KF$) are provided in finely divided solid form. For example, the fused mixture of complexes produced by heating a mixture of $AlF_3$ and $KF$ may be solidified by cooling and then ground to the appropriate particle size; or previously prepared $K_3AlF_6$ and $KAlF_4$ may be mixed in finely divided form, with further grinding as and if necessary to achieve particles of desired fineness.

In accordance with the invention, a flux as described above, e.g. in dry powdered form, is added to the particulate aluminum prior to sintering. While the proportion of flux thus added (based on the weight of aluminum and flux) may vary widely, i.e., from trace amounts up to 5% or even higher, e.g. as much as 10%, ordinarily a very small proportion of the flux (preferably about 0.25% to about 3% of the combined weight of particulate aluminum and flux) is used, and is mixed intimately and uniformly with the particulate aluminum to be sintered. Also preferably, the particle size of the dry flux is −100 mesh (U.S. Standard) with at least 50% of −325 mesh size.

A minor proportion of one or more alloying elements in particulate form may also be incorporated in the mixture. Broadly, any conventional aluminum-alloying element may be thus used; specific examples include copper, silicon, zinc and tin. Other such elements are silver, nickel, and germanium. If the alloying element differs appreciably from aluminum in density, it is preferably used in flake form, to maintain uniformity of distribution of the alloying element through the particulate aluminum, i.e., to prevent segregation within the mixture prior to sintering. Thus, for example, copper if used is preferably provided in flake form. the preparation of flake metal powders is well known in the art and accordingly need not be described in detail.

Preferably, the added alloying element is of −325 mesh (U.S. Standard) particle size. Such element or elements may be added in proportions (based on total weight of the mix) ranging from trace amounts to 5 or even 10%; a presently preferred range is about 0.5% to about 2%.

A liquid desegregator, such as odorless mineral spirits, may be added to the mixture if desired to help maintain uniform dispersion of the ingredients thereof.

For loose or gravity sintering, a cavity or mold of desired shape (made of a material that will not react with aluminum at the sintering temperature, e.g. graphite) is filled with a mixture as described above, i.e., a mixture of particulate aluminum with a minor proportion of flux and with or without a minor proportion of one or more alloying elements in particulate form. The mixture is not subjected to pressure or compaction. After the mold is filled, the particulate mixture is sintered therein, in any suitable furnace such as a batch-type or conveyor-type furnace, by heating to a temperature usually in a range between about 600° and about 660°C and holding at that temperature for 0 to about 15 minutes, in a dry atmosphere of gas inert with respect to aluminum at sintering temperatures. Typically the inert gas atmosphere is maintained at a dew point of −40°F, or even more dry, in the sintering zone. Optimum temperature, time, and dryness conditions are to some extent dependent on the type and oxide content of the particulate aluminum being sintered. annd the alloying element or elements (if any) mixed therewith.

It is presently believed that during sintering, the underlying aluminum of the metal particles expands slightly more than the surface oxide thereon, so that hairline cracks may develop in the oxide coating. At the same time, the flux, melting and spreading, works its way into the cracks and acts to fragment the oxide and lift it from the particle surfaces. In any event, it is apparent that in the sintering operation the flux melts and aids in removing oxide (typically $Al_2O_3$) from the aluminum particle surfaces. In addition, alloying elements if present form a liquid phase which promotes bonding; this is particularly advantageous if the aluminum used is, e.g., air-atomized powder having an oxygen content as high as 0.2 − 0.3%. The fluxing action, alone or in combination with the action of the alloying elements, results in attainment of satisfactory metal-to-metal bonding in the described loose sintering of particulate aluminum.

Structural stength and integrity are imparted to the produced article by the metal-to-metal bonds formed during sintering, while the shape of the article is that of the mold or cavity in which the particulate mixture is sintered. In other words, the article is shaped by sintering in a cavity of desired configuration rather than by compaction prior to sintering. High-porosity, low-density sintered aluminum articles such as filters are thereby readily achieved. A residue of flux is present on such articles after sintering; this residue is non-hygroscopic, since it consists essentially of the aforementioned potassium fluoaluminate complexes and is essentially free of unreacted potassium fluoride. The residue does not exhibit any tendency to promote corrosion of the sintered article, but instead acts as a protective coating thereon, i.e., tending to protect the article from corrosion. Consequently, there is a marked improvement in freedom of the product from susceptibility to corrosion.

In a broad sense, other materials (e.g. other metal fluorides and/or chlorides and mixtures thereof) may be employed as fluxes in loose sintering of particulate metals such as aluminum, for promoting oxide removal from the particles. Examples of such other fluxes include the material currently commercially available under the trade name "Amco 49" from Force Chemical Division, American Solder & Flux Co., which is a coarse powder containing lithium chloride, lithium fluoride, zinc chloride, sodium chloride, and potassium chloride; a mixture the same as the "Amco-49" material but lacking zinc chloride; and the material currently commercially available under the trade name "Eutector Flux190" from Eutectic Corp., a mixture of chlorides. Satisfactory loose sintering of particulate aluminum has been achieved with the foregoing materials, e.g. used in −100 mesh size powder form. However, the residues of these other fluxes comonly tend to promote corrosion and must therefore be removed after sintering.

By way of further illustration of the invention, reference may be made to the followinng specific examples:

EXAMPLE I

Ninety-eight parts by weight of air-atomized aluminum powder of −60 +150 mesh size (U.S. Standard) were mixed with one part by weight of copper flake, one part by weight of particulate silicon, and two parts by weight of a flux consisting essentially of an intimate mixture of potassium fluoaluminate complexes in finely divided form, essentially free of unreacted potassium fluoride. The mixture was sintered by heating to 625°C in a dry inert atmosphere, with a time in furnace of 15 minutes. The resultant sintered filter had the following properties:

Shrinkage: 10.0%
% Theoretical Density: 58.5
Air permeability
   pressure drop for 1 $CFM/in^2$
   - inches of water: 7.5
   pressure drop in p.s.i.: 0.27
Maximum pore diameter: 98.4 microns
   (back pressure, inches of water: 3.7)
Break strength: 150 lbs.
Appearance: clean and bright Permeability of the filter was determined by measuring the back pressure (in inches of water) when one cubic foot per minute of air was passed through a filter section having an area of one square inch; the smaller the back pressure, the greater is the permeability of the filter. Permeability is expressed above both as back pressure, in inches of water, and as pressure drop in p.s.i.

Maximum pore diameter was determined by filling the filter pores with alcohol and measuring the back pressure in inches of water when the air pressure was first sufficient to form a single bubble on the surface of the filter. Maximum pore diameter is also expressed in microns as calculated from the back pressure measurement.

All tests conformed to Standard 39-68 of the Metal Powder Industries Federation.

EXAMPLE II

The same mixture was used as in Example I, except that the particle size of the aluminum powder was −30 +60 mesh (U.S. Standard). Sintering was performed under the same conditions of time and atmosphere as in Example I, at a temperature of 630°C. Properties of the sintered filter were as follows (same tests as in Example I):

Shrinkage: 10.0%
    % Theoretical density: 50.4
    Air permeability
        pressure drop for 1 CFM/in²
        - inches of water: 2.5
        pressure drop in p.s.i.: 0.09
    Maximum pore diameter: 165.5 microns
        (back pressure, inches of water: 2.2)
    Break strength: 125 lbs.
    Appearance: clean and bright.

EXAMPLE III 99.75 parts by weight of 14 mesh size cut aluminum wire (0.055 in. diameter) were mixed with 0.25 parts by weight of the flux used in Examples I and II. The mixture was sintered for 15 minutes at 655°C in a dry inert atmosphere. Properties of the sintered filter, determined by the tests used in Example I, follow:

Shrinkage: 3.3%
    % Theoretical density: 62.9
    Air permeability
        pressure drop for 1 CFM/in²
        - inches of water: 0.3
        pressure drop in p.s.i.: 0.011
    Maximum pore diameter: 606.7 microns
        (back pressure, inches of water: 0.6)
    Break strength: 60 lbs.
    Appearance: clean and bright.

EXAMPLE IV

Ninety-eight parts by weight of −60 +150 mesh size (U.S. Standard) particles of the aluminum alloy designated AA 2219 by the Aluminum Association (an alloy containing 5.8 to 6.8% Cu, with much lesser amounts of other alloying elements) were mixed with two parts by weight of the same mixture of potassium fluoaluminate complexes used as flux in the preceding examples, and sintered at 610°C for 15 minutes in a dry inert atmosphere. The resultant sintered filter had the following properties (same tests as before):

Shrinkage: 3.3%
    % Theoretical Density: 52.8
    Air permeability
        pressure drop for 1 CFM/in²

-continued
        - inches of water: 3.0
        pressure drop in p.s.i.: 0.11
    Maximum pore diameter: 117.4 microns
        (back pressure, inches of water: 3.1)
    Break strength: 65 lbs.
    Appearance: clean and bright It is to be understood that the invention is not limited to the features and embodiments hereinabove specifically set forth but may be carried out in other ways without departure from its spirit.

I claim:

1. In a method of making sintered metal articles from particulate metals, the steps of
   a. mixing a major proportion of particulate metal comprising aluminum particles having an oxide coating with a minor proportion of a flux consisting essentially of an intimate mixture of potassium fluoaluminate complexes essentially free of unreacted potassium fluoride;
   b. disposing, for heating to produce a sintered article, a quantity of the mixture of metal and flux in a substantially uncompacted condition in which the oxide coatings of the aluminum particles are essentially unruptured; and
   c. heating the mixture of metal and flux to a temperature for sintering the metal while maintaining said quantity of the mixture in said substantially uncompacted condition throughout performance of the heating step.

2. A method according to claim 1, wherein said particulate metal comprises a major proportion of particulate aluminum and a minor proportion of at least one alloying element in particulate form.

3. A method of making porous sintered aluminum articles comprising
   a. mixing a major proportion of particulate metal comprising aluminum with a minor proportion of a flux consisting essentially of an intimate mixture of potassium fluoaluminate complexes essentially free of unreacted potassium fluoride and having a composition corresponding to an $AlF_3/KF$ ratio, in parts by weight, between about 65:35 and about 45:55;
   b. disposing, for heating to produce a sintered article, a quantity of the mixture of metal and flux in loose and uncompacted condition; and
   c. heating said quantity of the mixture of metal and flux to a temperature for sintering the metal while maintaining said quantity of the mixture in loose and uncompacted condition throughout performance of the heating step.

4. A method according to claim 3, wherein the heating step comprises heating the loose mixture of metal and flux to said temperature in an non-oxidizing atmosphere having a dew point of not more than about −40°F.

5. A method according to claim 3, wherein said flux, as mixed with said metal, is in finely divided solid form.

6. A method according to claim 5, wherein said flux is of −100 mesh particle size.

7. A method according to claim 5, wherein said flux is in a proportion constituting between about 0.25 and about 3% by weight of the mixture of metal and flux.

8. A method according to claim 5 wherein said particulate metal comprises a major proportion of aluminum particles and a minor proportion of particles of alloying material.

9. A method according to claim 8, wherein said particles of alloying material are of −325 mesh size.

10. A method according to claim 8, wherein each said alloying material is in a proportion constituting between about 0.5 and about 2% by weight of the mixture of metal and flux.

11. A method according to claim 3, wherein said metal comprises atomized aluminum powder in mixture with a minor proportion of at least one alloying element in particulate form.

12. A method according to claim 3, wherein said metal comprises cut aluminum wire.

* * * * *